(12) United States Patent
Lai

(10) Patent No.: US 12,079,613 B2
(45) Date of Patent: Sep. 3, 2024

(54) PROCESSING SYSTEM AND METHOD FOR UPDATING FIRMWARE ONLINE

(71) Applicant: Yu-Cheng Lai, Hsinchu County (TW)

(72) Inventor: Yu-Cheng Lai, Hsinchu County (TW)

(73) Assignee: ECOLUX Technology Co., Ltd., Hsinchu County (TW)

( * ) Notice: Subject to any disclaimer, the term of this patent is extended or adjusted under 35 U.S.C. 154(b) by 317 days.

(21) Appl. No.: 17/564,087

(22) Filed: Dec. 28, 2021

(65) Prior Publication Data
US 2023/0205507 A1 Jun. 29, 2023

(51) Int. Cl.
| | |
|---|---|
| *G06F 9/44* | (2018.01) |
| *G06F 8/65* | (2018.01) |
| *G06F 21/57* | (2013.01) |
| *H04L 9/32* | (2006.01) |
| *H04L 9/40* | (2022.01) |
| *H04L 41/082* | (2022.01) |

(52) U.S. Cl.
CPC .............. *G06F 8/65* (2013.01); *G06F 21/572* (2013.01); *H04L 9/3247* (2013.01); *H04L 41/082* (2013.01); *H04L 63/166* (2013.01); *G06F 2221/033* (2013.01)

(58) Field of Classification Search
CPC ........................................................ G06F 8/65
USPC ........................................................ 700/170
See application file for complete search history.

(56) References Cited

U.S. PATENT DOCUMENTS

| | | | |
|---|---|---|---|
| 9,383,990 B2* | 7/2016 | Lu | H04L 67/1095 |
| 2007/0169073 A1* | 7/2007 | O'Neill | G06F 8/61 |
| | | | 717/168 |
| 2014/0082373 A1* | 3/2014 | Colnot | G06F 21/575 |
| | | | 713/193 |
| 2021/0303223 A1* | 9/2021 | Fukumura | G06F 8/65 |

* cited by examiner

*Primary Examiner* — Evral E Bodden
(74) *Attorney, Agent, or Firm* — Ying-Ting Chen; Law Office of Michael Chen

(57) ABSTRACT

A processing system and a method for updating firmware online, the processing system executes following steps of: an electronic device sending a download request to a firmware security update server end; the firmware security update server end searching for a new version firmware information; if having the new version firmware information, the firmware security update server end decrypting an encrypted new version firmware file into a new version firmware file, and encrypting the new version firmware file with a unique feature to generate an exclusive encrypted new version firmware file, and generating a load point path information; and the electronic device receiving the load point path information, linking to the firmware security update server end and downloading the exclusive encrypted new version firmware file, and the electronic device decrypting the exclusive encrypted new version firmware file with the unique feature to obtain the new version firmware file.

8 Claims, 5 Drawing Sheets

PROCESSING SYSTEM AND METHOD FOR UPDATING FIRMWARE ONLINE

BACKGROUND OF THE INVENTION

Field of Invention

The invention relates to online updating system and method, and more particularly to a processing system and a method for updating firmware online.

Related Art

For electronic products, both hardware design and software design are equally important issues. In order to effectively control the related operations of hardware components, it is required to rely on the cooperation between software and firmware. Firmware is the communication medium between software and hardware; therefore, any problem with firmware will affect the use of electronic products in all aspects.

In addition, electronic products can provide more powerful functions through upgrading firmware. Due to the unique status of firmware, firmware update will directly affect electronic products. Especially for information security considerations, if an electronic device loads a firmware file with malicious codes, it may cause damage to the electronic product or leak the user's confidential information.

For the firmware providing end, the firmware providing end cannot verify the identity of the initiator requesting the download; therefore, it is unavoidable that a malicious third party pretends to be a legal electronic product to request the corresponding firmware from the firmware providing end.

SUMMARY OF THE INVENTION

In view of the above, a processing system for updating firmware online is provided in one embodiment to create exclusive firmware and download resources for electronic devices to ensure that users are protected from forging or attacking by malicious third parties during a firmware update process.

In order to achieve the above object, the invention provides a processing system for updating firmware online comprising: a firmware source end capable of generating at least one encrypted new version firmware file and a new version firmware information; a firmware security update server end connecting to the firmware source end, the firmware security update server end receives and stores the new version firmware information and the encrypted new version firmware file, and decrypts the encrypted new version firmware file into a new version firmware file, and the firmware security update server end encrypts the new version firmware file with a unique feature to generate an exclusive encrypted new version firmware file, and generates a load point path information based on the exclusive encrypted new version firmware file; and at least one electronic device connected to the firmware security update server end, the electronic device receives the load point path information, then links to the firmware security update server end via the load point path information and downloads the exclusive encrypted new version firmware file, and the electronic device decrypts the exclusive encrypted new version firmware file based on the unique feature to obtain the new version firmware file.

According to one embodiment of the processing system for updating firmware online of the invention, wherein the firmware security update server end further comprises: a firmware storage end connected to the firmware source end, receiving and storing the new version firmware information and the encrypted new version firmware file; at least one firmware production server connected to the firmware storage end to receive the encrypted new version firmware file; a security computing end connected to the firmware production server, the security computing end receives the encrypted new version firmware file and decrypts the encrypted new version firmware file to generate the new version firmware file, and encrypts the new version firmware file with the unique feature to generate an exclusive encrypted new version firmware file, then sends the exclusive encrypted new version firmware file to the firmware production server, and the firmware production server generates the load point path information from the exclusive encrypted new version firmware file; an update management end connected to the firmware storage end and receiving the new version firmware information, and connected to the firmware production server and receiving the load point path information; a firmware providing end connected to the firmware production server and receiving the exclusive encrypted new version firmware file; and an electronic device connected to the update management end and the firmware providing end, the electronic device receives the load point path information, then links to the firmware providing end via the load point path information and downloads the exclusive encrypted new version firmware file at the firmware providing end, and the electronic device decrypts the exclusive encrypted new version firmware file with the unique feature to obtain the new version firmware file.

According to one embodiment of the processing system for updating firmware online of the invention, wherein the firmware source end uses a signature private key to sign for the encrypted new version firmware file to generate a signature information, and uses an encryption public key to encrypt the signature information and an encrypted new version firmware key to generate an encrypted signature information and an encrypted key, and sends the encrypted new version firmware file, the encrypted signature information and the encrypted key to the security computing end via the firmware storage end and the firmware production server, the security computing end uses a decryption private key to decrypt the encrypted signature information and the encrypted key to obtain the signature information and the encrypted new version firmware key, the security computing end uses the encrypted new version firmware key to decrypt the encrypted new version firmware file to obtain the new version firmware file, and the security computing end uses a verification public key to verify the signature information and to confirm that the encrypted new version firmware file comes from the firmware source end.

According to one embodiment of the processing system for updating firmware online of the invention, wherein a transport layer security (TLS) connection is established between the firmware source end and the firmware storage end.

According to one embodiment of the processing system for updating firmware online of the invention, further comprising an information serial console and a load server, the information serial console connecting to the update management end and the firmware production server, the load server connecting to the information serial console and connecting to the update management end and the firmware production server via the information serial console, and the load server selecting the one with a least current load from the firmware production servers as a target server according to a current load of the firmware production servers.

The invention further provides a processing method for updating firmware online comprising following steps of:
an electronic device sending a download request to a firmware security update server end;
the firmware security update server end searching for a new version firmware information according to the download request;
if the firmware security update server end having the new version firmware information corresponding to the electronic device, the firmware security update server end decrypting an encrypted new version firmware file corresponding to the electronic device into a new version firmware file, and encrypting the new version firmware file with a unique feature to generate an exclusive encrypted new version firmware file, and generating a load point path information based on the exclusive encrypted new version firmware file; and
the electronic device receiving the load point path information, then linking to the firmware security update server end via the load point path information and downloading the exclusive encrypted new version firmware file at the firmware security update server end, and the electronic device decrypting the exclusive encrypted new version firmware file with the unique feature to obtain the new version firmware file.

According to one embodiment of the processing method for updating firmware online of the invention, wherein the firmware security update server end comprises steps of:
the update management end searching for a new version firmware information according to the download request;
if the update management end having the new version firmware information corresponding to the electronic device, the update management end causing a firmware storage end to send an encrypted new version firmware file corresponding to the electronic device to a firmware production server;
the firmware production server sending the encrypted new version firmware file to a security computing end;
the security computing end decrypting the encrypted new version firmware file into a new version firmware file, and encrypting the new version firmware file with a unique feature to generate an exclusive encrypted new version firmware file, and sending the exclusive encrypted new version firmware file to the firmware production server;
the firmware production server generating a load point path information based on the exclusive encrypted new version firmware file, sending the exclusive encrypted new version firmware file to the firmware providing end, and sending the load point path information to the update management end; and
the electronic device receiving the load point path information, then linking to the firmware providing end via the load point path information and downloading the exclusive encrypted new version firmware file at the firmware providing end, and the electronic device decrypting the exclusive encrypted new version firmware file with the unique feature to obtain the new version firmware file.

According to one embodiment of the processing method for updating firmware online of the invention, wherein the step of the update management end causing the firmware storage end to send the encrypted new version firmware file corresponding to the electronic device to the firmware production server comprises steps of: the update management end sending a production command to a load server through an information serial console, and the load server selecting the one with a least current load from the firmware production servers as a target server according to a current load of the firmware production servers.

According to one embodiment of the processing method for updating firmware online of the invention, wherein comprising a security mechanism: a firmware source end sending the encrypted new version firmware file and the new version firmware information to the firmware storage end;
the firmware source end using a signature private key to sign for the encrypted new version firmware file to generate a signature information, and using an encryption public key to encrypt the signature information and an encrypted new version firmware key to generate an encrypted signature information and an encrypted key, and sending the encrypted new version firmware file, the encrypted signature information and the encrypted key to the firmware storage end;
the firmware storage end sending the encrypted new version firmware file, the encrypted signature information and the encrypted key to the firmware production server;
the firmware production server sending the encrypted new version firmware file, the encrypted signature information and the encrypted key to the security computing end; and
the security computing end using a decryption private key to decrypt the encrypted signature information and the encrypted key to obtain the signature information and the encrypted new version firmware key, the security computing end using the encrypted new version firmware key to decrypt the encrypted new version firmware file to obtain the new version firmware file, and the security computing end using a verification public key to verify the signature information and to confirm that the encrypted new version firmware file coming from the firmware source end.

According to one embodiment of the processing method for updating firmware online of the invention, wherein comprising a security mechanism: a firmware source end sending the encrypted new version firmware file and the new version firmware information to the firmware storage end, and establishing a transport layer security (TLS) connection between the firmware source end and the firmware storage end.

DETAILED DESCRIPTION OF THE INVENTION

The above objects of the invention, as well as its structural and functional features, will be described in accordance with the preferred embodiments of the accompanying drawings.

Figure 1:
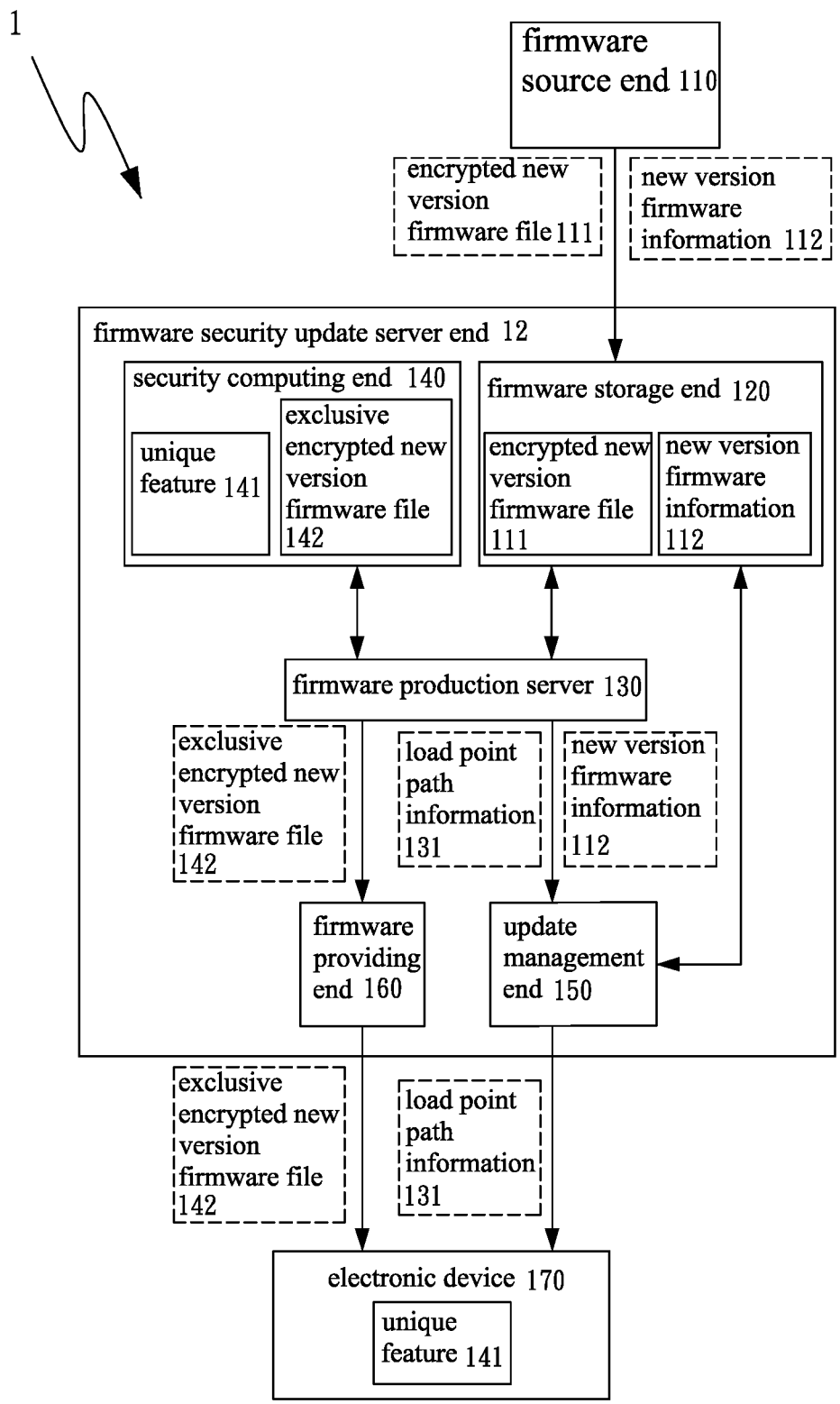
FIG. 1 is a system architecture diagram of a processing system for updating firmware online of the invention.

Please refer to FIG. 1 for a system architecture diagram of a processing system for updating firmware online of the invention. It can be clearly seen from the figure that a processing system 1 for updating firmware online comprises a firmware source end 110 and a firmware security update server end 12, the firmware security update server end 12 comprises a firmware storage end 120, at least one firmware production server 130, a security computing end 140, an update management end 150, a firmware providing end 160, and at least one electronic device 170.

Wherein the firmware source end 110 is capable of generating at least one encrypted new version firmware file 111 and a new version firmware information 112, the firmware storage end 120 is electrically connected to the firmware source end 110, and the firmware storage end 120 receives the encrypted new version firmware file 111 and the new version firmware information 112 and stores the encrypted new version firmware file 111 and the new version firmware information 112. The firmware production server 130 is connected to the firmware storage end 120, and the firmware production server 130 receives the encrypted new version firmware file 111. The security computing end 140 is connected to the firmware production server 130, and the security computing end 140 is provided with at least one unique feature 141. The update management end 150 and the firmware providing end 160 are respectively connected to the firmware production server 130. The electronic device 170 is connected to the update management end 150 and the firmware providing end 160, and the electronic device 170 comprises the unique feature 141, wherein the unique feature 141 of the security computing end 140 and the electronic device 170 can be an universally unique identifier (UUID), a device model, or a certificate of the electronic device 170.

Wherein when the firmware source end 110 generates the encrypted new version firmware file 111 and the new version firmware information 112, the firmware source end 110 sends the encrypted new version firmware file 111 and the new version firmware information 112 to the firmware storage end 120, in addition to receiving and storing the encrypted new version firmware file 111 and the new version firmware information 112, the firmware storage end 120 also sends the new version firmware information 112 to the update management end 150.

When the electronic device 170 sends a firmware update download request to the update management end 150, the update management end 150 will first confirm an identity of the electronic device 170. The electronic device 170 and the update management end 150 establish a connection between each other with an identity authentication mechanism. The identity authentication mechanism can be the update management end 150 performing a public key infrastructure (PKI) identity authentication on the electronic device 170 or a transport layer security (TLS) connection established between the electronic device 170 and the update management end 150. After the update management end 150 confirms the identity of the electronic device 170, and with the new version firmware information 112 received by the update management end 150, the update management end 150 can find out whether a new version firmware file used by the electronic device 170 has been generated. If the firmware source end 110 has not generated the new version firmware file required by the electronic device 170, the update management end 150 sends a response message to the electronic device 170 to inform the electronic device 170 that the new version firmware file required by the electronic device 170 is not available at this time.

Conversely, if the update management end 150 knows that the new version firmware file used by the electronic device 170 has been generated, the update management end 150 determines whether an exclusive encrypted new version firmware file 142 corresponding to the electronic device 170 has been generated, if the exclusive encrypted new version firmware file 142 has not been generated, the update management end 150 will notify the electronic device 170 that its new version firmware file has been released by the firmware source end 110 but is not available for download, and at the same time, the update management end 150 generates a production command for the firmware production server 130, and the firmware production server 130 receives the encrypted new version firmware file 111 of the firmware storage end 120, and the firmware production server 130 sends the encrypted new version firmware file 111 to the security computing end 140, and the security computing end 140 receives the encrypted new version firmware file 111 and decrypts the encrypted new version firmware file 111 into a new version firmware file. Decryption for the encrypted new version firmware file 111 can be performed by paired public and private keys of the firmware source end 110 and the security computing end 140, and then the security computing end 140 encrypts the new version firmware file with the unique feature 141 of the electronic device 170 to generate the exclusive encrypted new version firmware file 142. After the security computing end 140 generates the exclusive encrypted new version firmware file 142, the security computing end 140 sends the exclusive encrypted new version firmware file 142 to the firmware production server 130, after the firmware production server 130 receives the exclusive encrypted new version firmware file 142, the firmware production server 130 generates a load point path information 131 corresponding to the exclusive encrypted new version firmware file 142. Wherein the load point path information 131 can be a file transfer protocol (FTP) space or a uniform resource locator (URL) path information space, and the firmware production server 130 sends the exclusive encrypted new version firmware file 142 to the firmware providing end 160 after the load point path information 131 is generated, and then sends the load point path information 131 to the update management end 150 so that the update management end 150 has the load point path information 131, and the firmware providing end 160 has the exclusive encrypted new version firmware file 142. Then, if the electronic device 170 sends a firmware update download request to the update management end 150 again, the update management end 150 sends the load point path information 131 to the electronic device 170, and the electronic device 170 can download the exclusive encrypted new version firmware file 142 by connecting to the firmware providing end 160 via the load point path information 131. After the electronic device 170 downloads the exclusive encrypted new version firmware file 142, the electronic device 170 decrypts the exclusive encrypted new version firmware file 142 with the unique feature 141 of the electronic device 170 to obtain the new version firmware file.

Wherein the electronic device 170 can be, but is not limited to, personal computer, notebook computer, mobile communication device, tablet computer, chip, or other computing devices with communication capabilities.

Figure 2:
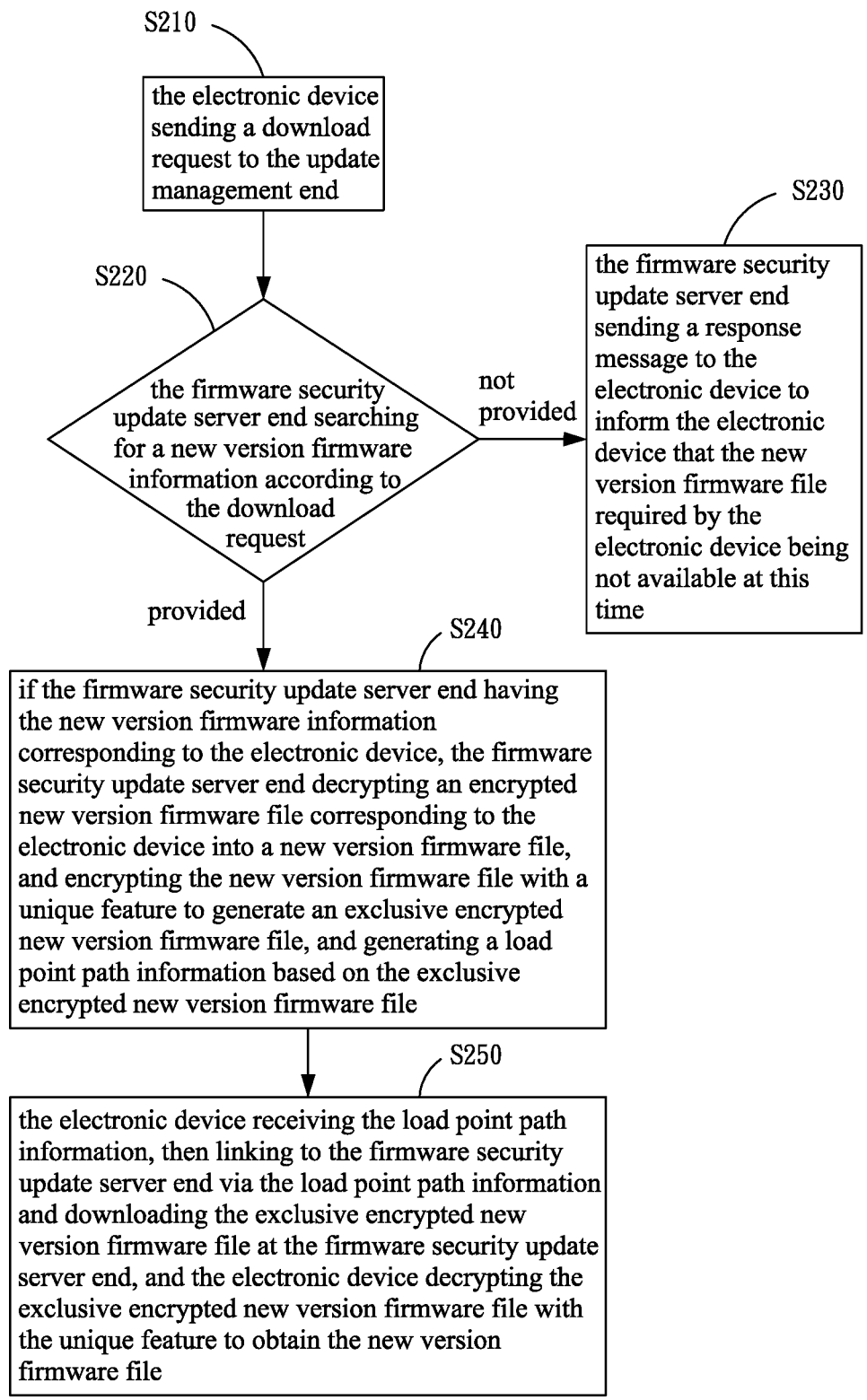
FIG. 2 is a flow chart of a processing method for updating firmware online of the invention.

In order to clearly explain an overall operation flow of the processing system 1 for updating firmware online, please refer to FIG. 2 for a flow chart of a processing method for updating firmware online of the invention; the processing method for updating firmware online comprising:

step S210: the electronic device 170 sending a download request to the update management end 150;

step S220: the firmware security update server end 12 searching for a new version firmware information according to the download request; if the firmware security update server end 12 being not provided with the new version firmware information corresponding to the electronic device 170, proceeding to step S230: the firmware security update server end 12 sending a response message to the electronic device 170 to inform the electronic device 170 that the new version firmware file required by the electronic device 170 being not available at this time; conversely, if the firmware security update server end 12 having the new version firmware information corresponding to the electronic device 170, proceeding to step S240;

step S240: if the firmware security update server end 12 having the new version firmware information corresponding to the electronic device 170, the firmware security update server end 12 decrypting an encrypted new version firmware file 111 corresponding to the electronic device 170 into a new version firmware file, and encrypting the new version firmware file with a unique feature 141 to generate an exclusive encrypted new version firmware file 142, and generating a load point path information 131 based on the exclusive encrypted new version firmware file 142; and step S250: the electronic device 170 receiving the load point path information 131, then linking to the firmware security update server end 12 via the load point path information 131 and downloading the exclusive encrypted new version firmware file 142 at the firmware security update server end 12, and the electronic device 170 decrypting the exclusive encrypted new version firmware file 142 with the unique feature 141 to obtain the new version firmware file.

Figure 3:
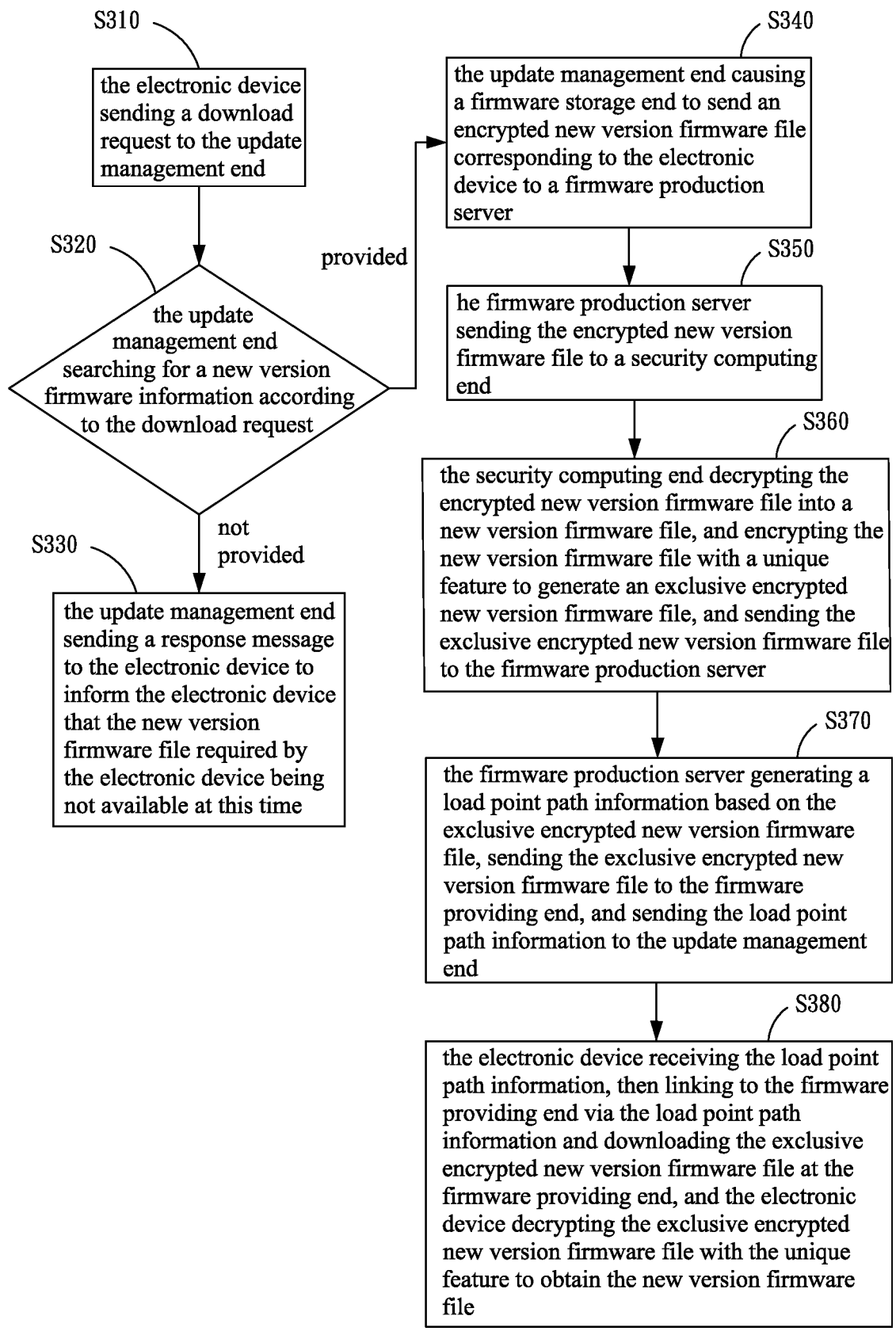
FIG. 3 is an embodiment of a flow chart of the processing method for updating firmware online of the invention.

Please refer to FIG. 3 for an embodiment of a flow chart of the processing method for updating firmware online of the invention; the processing method for updating firmware online comprising:

step S310: the electronic device 170 sending a download request to the update management end 150;

step S320: the update management end 150 searching for a new version firmware information according to the download request; if the update management end 150 being not provided with the new version firmware information corresponding to the electronic device 170, proceeding to step S330: the update management end 150 sending a response message to the electronic device 170 to inform the electronic device 170 that the new version firmware file required by the electronic device 170 being not available at this time; conversely, if the update management end 150 having the new version firmware information corresponding to the electronic device 170, proceeding to step S340;

step S340: the update management end 150 causing a firmware storage end 120 to send an encrypted new version firmware file 111 corresponding to the electronic device 170 to a firmware production server 130;

step S350: the firmware production server 130 sending the encrypted new version firmware file 111 to a security computing end 140;

step S360: the security computing end 140 decrypting the encrypted new version firmware file 111 into a new version firmware file, and encrypting the new version firmware file with a unique feature 141 to generate an exclusive encrypted new version firmware file 142, and sending the exclusive encrypted new version firmware file 142 to the firmware production server 130;

step S370: the firmware production server 130 generating a load point path information 131 based on the exclusive encrypted new version firmware file 142, sending the exclusive encrypted new version firmware file 142 to the firmware providing end 160, and sending the load point path information 131 to the update management end 150; and step S380: the electronic device 170 receiving the load point path information 131, then linking to the firmware providing end 160 via the load point path information 131 and downloading the exclusive encrypted new version firmware file 142 at the firmware providing end 160, and the electronic device 170 decrypting the exclusive encrypted new version firmware file 142 with the unique feature 141 to obtain the new version firmware file.

Figure 4:
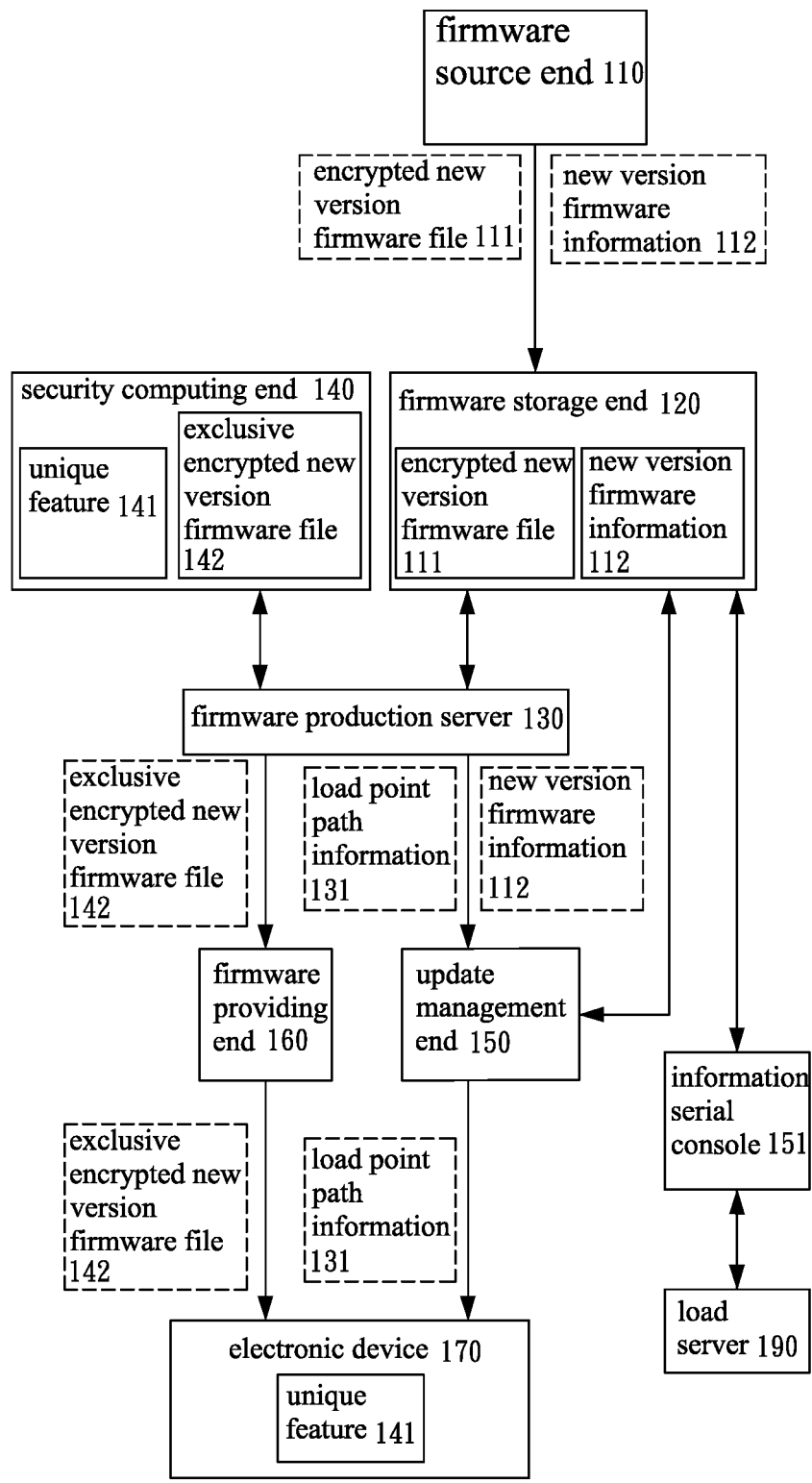
FIG. 4 is a system architecture diagram of the processing system for updating firmware online of the invention with addition of an information serial console and a load server.

Please refer to FIG. 4 for a system architecture diagram of the processing system 1 for updating firmware online of the invention with addition of an information serial console and a load server. The processing system 1 for updating firmware online further comprises an information serial console 151 and a load server 190, the information serial console 151 is connected to the update management end 150 and the firmware production server 130, and the load server 190 is connected to the information serial console 151 and connected to the update management end 150 and the firmware production server 130 via the information serial console 151, and the load server 190 selects the one with a least current load from the firmware production servers 130 as a target server according to a current load of the firmware production servers 130.

The current load can be, but is not limited to, operating load, network throughput load, or storage space load of a central processing unit. When the load server 190 receives the encrypted new version firmware file 111, the load server 190 will evaluate the current load of all the firmware production servers 130. The load server 190 selects the one with a least current load from the firmware production servers 130 as the target server.

Figure 5:
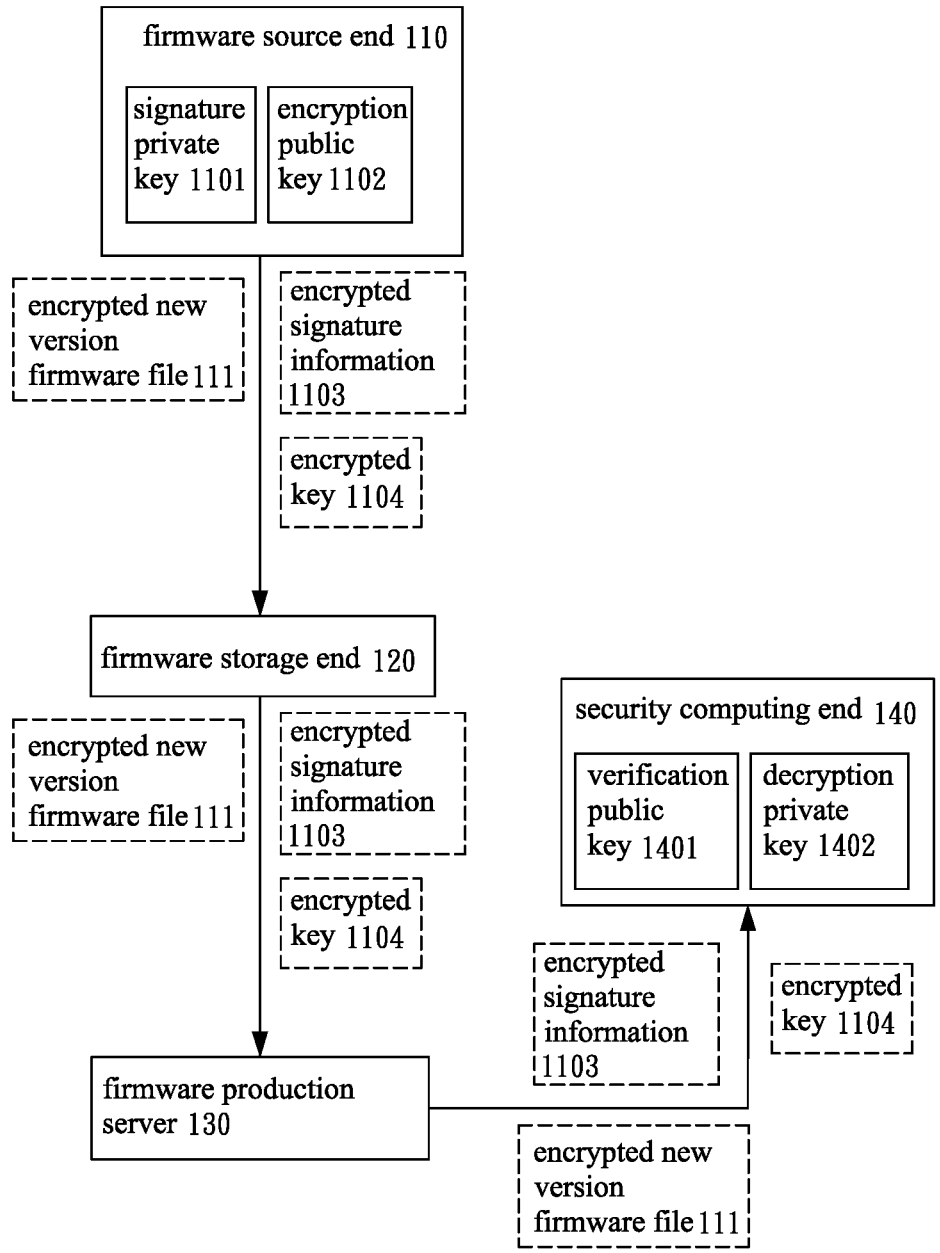
FIG. 5 is a schematic diagram of a secure transmission system of the processing system for updating firmware online of the invention.

Please refer to FIG. 5 for a schematic diagram of a secure transmission system of the processing system 1 for updating firmware online of the invention. Wherein the firmware source end 110 uses a signature private key 1101 to sign for the encrypted new version firmware file 111 to generate a signature information, and uses an encryption public key 1102 to encrypt the signature information and an encrypted new version firmware key to generate an encrypted signature information 1103 and an encrypted key 1104, and sends the encrypted new version firmware file 111, the encrypted signature information 1103 and the encrypted key 1104 to the security computing end 140 via the firmware storage end 120 and the firmware production server 130, the security computing end 140 uses a decryption private key 1402 to decrypt the encrypted signature information 1103 and the encrypted key 1104 to obtain the signature information and the encrypted new version firmware key, the security computing end 140 uses the encrypted new version firmware key to decrypt the encrypted new version firmware file 111 to obtain the new version firmware file, and the security computing end 140 uses a verification public key 1401 to verify the signature information and to confirm that the encrypted new version firmware file 111 comes from the firmware source end 110. This ensures that the encrypted new version firmware file 111 is sent to the correct firmware security update server end 12, and avoids being cracked and used when the encrypted new version firmware file 111 is lost.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. A processor for updating firmware online comprising:
    a firmware source end capable of generating at least one encrypted new version firmware file and a new version firmware information;
    a firmware security update server end connecting to the firmware source end, the firmware security update server end receiving and storing the new version firmware information and the encrypted new version firmware file, and decrypting the encrypted new version firmware file into a new version firmware file, and the firmware security update server end encrypting the new version firmware file with a unique feature to generate an exclusive encrypted new version firmware file, and generating a load point path information based on the exclusive encrypted new version firmware file; and
    at least one electronic device connected to the firmware security update server end, the electronic device receiving the load point path information, then linking to the firmware security update server end via the load point path information and downloading the exclusive encrypted new version firmware file, and the electronic device decrypting the exclusive encrypted new version firmware file based on the unique feature to obtain the new version firmware file,
    wherein the firmware security update server end comprises:
    a firmware storage end connected to the firmware source end, receiving and storing the new version firmware information and the encrypted new version firmware file;
    at least one firmware production server connected to the firmware storage end to receive the encrypted new version firmware file;
    a security computing end connected to the firmware production server, the security computing end receives the encrypted new version firmware file and decrypts the encrypted new version firmware file to generate the new version firmware file, and encrypts the new version firmware file with the unique feature to generate an exclusive encrypted new version firmware file, then sends the exclusive encrypted new version firmware file to the firmware production server, and the firmware production server generates the load point path information from the exclusive encrypted new version firmware file;
    an update management end connected to the firmware storage end and receiving the new version firmware information, and connected to the firmware production server and receiving the load point path information;
    a firmware providing end connected to the firmware production server and receiving the exclusive encrypted new version firmware file; and
    an electronic device connected to the update management end and the firmware providing end, the electronic device receives the load point path information, then links to the firmware providing end via the load point path information and downloads the exclusive encrypted new version firmware file at the firmware providing end, and the electronic device decrypts the exclusive encrypted new version firmware file with the unique feature to obtain the new version firmware file.

2. The processor for updating firmware online as claimed in claim 1, wherein the firmware source end uses a signature private key to sign for the encrypted new version firmware file to generate a signature information, and uses an encryption public key to encrypt the signature information and an encrypted new version firmware key to generate an encrypted signature information and an encrypted key, and sends the encrypted new version firmware file, the encrypted signature information and the encrypted key to the security computing end via the firmware storage end and the firmware production server, the security computing end uses a decryption private key to decrypt the encrypted signature information and the encrypted key to obtain the signature information and the encrypted new version firmware key, the security computing end uses the encrypted new version firmware key to decrypt the encrypted new version firmware file to obtain the new version firmware file, and the security computing end uses a verification public key to verify the signature information and to confirm that the encrypted new version firmware file comes from the firmware source end.

3. The processor for updating firmware online as claimed in claim 1, wherein a transport layer security (TLS) connection is established between the firmware source end and the firmware storage end for secure connection.

4. The processor for updating firmware online as claimed in claim 1, further comprising an information serial console and a load server, the information serial console connecting to the update management end and the firmware production server, the load server connecting to the information serial console and connecting to the update management end and the firmware production server via the information serial console, and the load server selecting the one with a least current load from the firmware production servers as a target server according to a current load of the firmware production servers.

5. A processing method for updating firmware online comprising steps of:
    an electronic device sending a download request to a firmware security update server end;
    the firmware security update server end searching for a new version firmware information according to the download request;
    if the firmware security update server end has the new version firmware information corresponding to the electronic device, the firmware security update server end decrypting an encrypted new version firmware file corresponding to the electronic device into a new version firmware file, and encrypting the new version firmware file with a unique feature to generate an exclusive encrypted new version firmware file, and generating a load point path information based on the exclusive encrypted new version firmware file; and
    the electronic device receiving the load point path information, then linking to the firmware security update server end via the load point path information and downloading the exclusive encrypted new version firmware file at the firmware security update server end, and the electronic device decrypting the exclusive encrypted new version firmware file with the unique feature to obtain the new version firmware file, wherein the firmware security update server end comprises steps of:

the update management end searching for a new version firmware information according to the download request;

if the update management end has the new version firmware information corresponding to the electronic device, the update management end causing a firmware storage end to send an encrypted new version firmware file corresponding to the electronic device to a firmware production server;

the firmware production server sending the encrypted new version firmware file to a security computing end;

the security computing end decrypting the encrypted new version firmware file into a new version firmware file, and encrypting the new version firmware file with a unique feature to generate an exclusive encrypted new version firmware file, and sending the exclusive encrypted new version firmware file to the firmware production server;

the firmware production server generating a load point path information based on the exclusive encrypted new version firmware file, sending the exclusive encrypted new version firmware file to the firmware providing end, and sending the load point path information to the update management end; and the electronic device receiving the load point path information, then linking to the firmware providing end via the load point path information and downloading the exclusive encrypted new version firmware file at the firmware providing end, and the electronic device decrypting the exclusive encrypted new version firmware file with the unique feature to obtain the new version firmware file.

6. The processing method for updating firmware online as claimed in claim 5, wherein the step of the update management end causing the firmware storage end to send the encrypted new version firmware file corresponding to the electronic device to the firmware production server comprises steps of:

the update management end sending a production command to a load server through an information serial console, and the load server selecting the one with a least current load from the firmware production servers as a target server according to a current load of the firmware production servers.

7. The processing method for updating firmware online as claimed in claim 5, wherein comprising a security mechanism: a firmware source end sending the encrypted new version firmware file and the new version firmware information to the firmware storage end;

the firmware source end using a signature private key to sign for the encrypted new version firmware file to generate a signature information, and using an encryption public key to encrypt the signature information and an encrypted new version firmware key to generate an encrypted signature information and an encrypted key, and sending the encrypted new version firmware file, the encrypted signature information and the encrypted key to the firmware storage end;

the firmware storage end sending the encrypted new version firmware file, the encrypted signature information and the encrypted key to the firmware production server;

the firmware production server sending the encrypted new version firmware file, the encrypted signature information and the encrypted key to the security computing end; and the security computing end using a decryption private key to decrypt the encrypted signature information and the encrypted key to obtain the signature information and the encrypted new version firmware key, the security computing end using the encrypted new version firmware key to decrypt the encrypted new version firmware file to obtain the new version firmware file, and the security computing end using a verification public key to verify the signature information and to confirm that the encrypted new version firmware file coming from the firmware source end.

8. The processing method for updating firmware online as claimed in claim 5, wherein comprising a security mechanism: a firmware source end sending the encrypted new version firmware file and the new version firmware information to the firmware storage end, and establishing a transport layer security (TLS) connection between the firmware source end and the firmware storage end.

* * * * *